(12) United States Patent
Cheng et al.

(10) Patent No.: US 12,531,296 B2
(45) Date of Patent: Jan. 20, 2026

(54) OUTER PACKAGING MATERIAL FOR BATTERY APPARATUS, AND BATTERY

(71) Applicant: SHANGHAI ENERGY NEW MATERIALS TECHNOLOGY CO., LTD., Shanghai (CN)

(72) Inventors: Alex Cheng, Shanghai (CN); Bin Chen, Shanghai (CN); Xiaoming Wang, Shanghai (CN); Hui Wang, Shanghai (CN); Shaobo Yu, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 574 days.

(21) Appl. No.: 17/926,396

(22) PCT Filed: Mar. 11, 2021

(86) PCT No.: PCT/CN2021/080284
§ 371 (c)(1),
(2) Date: Nov. 18, 2022

(87) PCT Pub. No.: WO2021/232903
PCT Pub. Date: Nov. 25, 2021

(65) Prior Publication Data
US 2023/0187743 A1 Jun. 15, 2023

(30) Foreign Application Priority Data
May 21, 2020 (CN) .......................... 202010434841.9

(51) Int. Cl.
*H01M 50/129* (2021.01)
*B32B 7/12* (2006.01)
(Continued)

(52) U.S. Cl.
CPC ............. *H01M 50/129* (2021.01); *B32B 7/12* (2013.01); *B32B 15/085* (2013.01); *B32B 15/20* (2013.01);
(Continued)

(58) Field of Classification Search
None
See application file for complete search history.

(56) References Cited

U.S. PATENT DOCUMENTS

2022/0285763 A1* 9/2022 Chun .................... B32B 27/281
2022/0375697 A1* 11/2022 Hayashi ................. B32B 27/08
(Continued)

FOREIGN PATENT DOCUMENTS

| CN | 1563495 A | 1/2005 |
|---|---|---|
| CN | 103140592 A | 6/2013 |

(Continued)

OTHER PUBLICATIONS

Supplementary European Search Report, Jun. 28, 2024.
Korea Patent Office, "Office Action", Feb. 24, 2025, Korea.
China Patent Office, "Office Action", Dec. 8, 2020, China.

*Primary Examiner* — Kevin M Bernatz
(74) *Attorney, Agent, or Firm* — Troutman Pepper Locke LLP; Tim Tingkang Xia, Esq.

(57) ABSTRACT

An outer packaging material for a battery apparatus, the material comprising a base layer (1), a bonding layer (2), a barrier layer (5), another bonding layer (7), and a hot-melt adhesive layer (8); the bonding layer (2) is disposed between the base layer (1) and the barrier layer (5); the other bonding layer (7) is disposed between the barrier layer (5) and the hot-melt adhesive layer (8); the barrier layer (5) is composed of a single layer or multiple layers of aluminum alloy foil; the aluminum alloy foil composition and the mass percentage thereof comprises over 1.2% Fe content and over 1% Mg content; after undergoing annealing treatment, a large (Continued)

amount of Mg will precipitate out from within the aluminum foil, and the ratio of the precipitated Mg amount to a precipitated Al amount is between 2-4.

11 Claims, 1 Drawing Sheet

(51) Int. Cl.
| | |
|---|---|
| *B32B 15/085* | (2006.01) |
| *B32B 15/088* | (2006.01) |
| *B32B 15/09* | (2006.01) |
| *B32B 15/20* | (2006.01) |
| *B32B 27/08* | (2006.01) |
| *B32B 27/32* | (2006.01) |
| *B32B 27/34* | (2006.01) |
| *B32B 27/36* | (2006.01) |
| *H01M 50/105* | (2021.01) |
| *H01M 50/119* | (2021.01) |
| *H01M 50/121* | (2021.01) |
| *H01M 50/133* | (2021.01) |

(52) U.S. Cl.
CPC ........... *B32B 27/32* (2013.01); *H01M 50/105* (2021.01); *H01M 50/119* (2021.01); *H01M 50/121* (2021.01); *H01M 50/133* (2021.01); *B32B 15/088* (2013.01); *B32B 15/09* (2013.01); *B32B 27/08* (2013.01); *B32B 27/34* (2013.01); *B32B 27/36* (2013.01); *B32B 2255/06* (2013.01); *B32B 2255/26* (2013.01); *B32B 2264/1052* (2020.08); *B32B 2264/303* (2020.08); *B32B 2307/518* (2013.01); *B32B 2307/714* (2013.01); *B32B 2307/732* (2013.01); *B32B 2457/10* (2013.01); *B32B 2553/00* (2013.01)

(56) References Cited

U.S. PATENT DOCUMENTS

| | | | |
|---|---|---|---|
| 2023/0022746 A1* | 1/2023 | Suzuki | ................ C22F 1/04 |
| 2023/0039112 A1* | 2/2023 | Suzuki | ............... C22F 1/047 |
| 2024/0025151 A1* | 1/2024 | Cheng | ................ B32B 33/00 |
| 2024/0034029 A1* | 2/2024 | Cheng | ............. H01M 50/105 |
| 2024/0304904 A1* | 9/2024 | Takahagi | ............ B32B 27/34 |

FOREIGN PATENT DOCUMENTS

| | | | | |
|---|---|---|---|---|
| CN | 110867534 A | 3/2020 | | |
| EP | 4084029 A1 | 11/2022 | | |
| WO | 2014034240 A1 † | 3/2014 | | |
| WO | WO-2019017457 A1 * | 1/2019 | .......... H01M 50/198 |

\* cited by examiner
† cited by third party

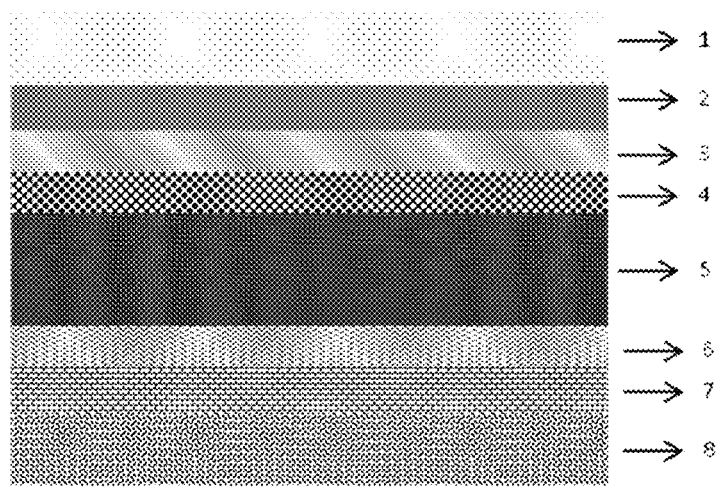

OUTER PACKAGING MATERIAL FOR BATTERY APPARATUS, AND BATTERY

TECHNICAL FIELD

The present invention relates to the technical field of aluminum-plastic film production, and in particular to an outer packaging material for a battery apparatus and a battery.

BACKGROUND

At present, lithium-ion batteries are mainly divided into three categories: square lithium-ion batteries, cylinder lithium-ion batteries and soft pack lithium-ion batteries. The housings of the square and cylinder lithium-ion batteries are mainly made of hard materials such as aluminum alloys and stainless steel, and the aluminum alloy housing can be made of pure aluminum. The housings of the soft pack lithium-ion batteries are made of aluminum-plastic composite films, which greatly improve the inflexibility in shape design of hard pack batteries.

The aluminum-plastic composite film comprises the following components in sequence from outside to inside: a nylon surface layer, an outer glue layer, an aluminum foil, an inner glue layer and a heat-sealing layer. As the outer packaging material for batteries, the aluminum-plastic film is required to have high deep drawing and resistance to electrolyte solution corrosion, so as to prevent problems like battery leakage and ensure the service life of the batteries.

The aluminum foil material in the aluminum-plastic composite film used for the outer packaging for the lithium-ion batteries is generally a heat-treated 8021 or 8079 alloy having a thickness of 20-100 μm. Non-heat-treated 3003 or 3004 aluminum foil is generally used as hard pack materials for the lithium-ion batteries, with a thickness of more than 100 μm.

Different aluminum foil materials contain different alloy components and have different intentions of use. Components of 8021 aluminum alloy are shown in the following table:

TABLE 1

| Components of A8021 alloy | | | | | | | | | | |
|---|---|---|---|---|---|---|---|---|---|---|
| Alloy number | Si | Fe | Cu | Mn | Mg | Cr | Ni | Zn | Ga | V | Ti |
| A8021 | 0.15% or less | 1.2%-1.7% | 0.05% or less | — | — | — | — | — | — | — | — |

As can be seen from the above table, the currently available 8021 alloy is characterized by containing 1.2%-1.7% of Fe and 0.15% or less of Si. Since the raw material bauxite is a mixture of multiple alloys, Si is inevitably present in the raw material rather than being added on purpose to improve the property of the 8021 alloy. However, the amount of Si is generally managed and controlled during the production process to avoid impact on quality stability of the aluminum foil, so the target content of Si is usually controlled at 0.2% or less.

Three factors that affect the deep drawing performance of the aluminum foil are tensile strength, 0.2% yield point and elongation. Among them, mechanical properties such as tensile strength and elongation are greatly related to the precipitation of Fe in the alloy. One of the factors affecting the precipitation of Fe is the content of Si in the aluminum foil. In the production process of aluminum foils, Si has an effect of promoting the precipitation of Fe, and then forms an intermediate compound with Fe and Al, which acts as a recrystallization nucleus during annealing. Although the starting particle size of the crystal nucleus is mostly about 1 μm, the particle size of the finally formed crystal may be small.

One of the reasons for using the heat-treated 8021 or 8079 alloy aluminum foil in the aluminum-plastic composite film is the certain amount of Fe in the heat-treated 8021 or 8079 alloy aluminum foil, thus having greater elasticity than other aluminum foils, which is beneficial to deep drawing forming of the aluminum-plastic composite film. In the lithium-ion batteries, the aluminum-plastic composite film is required to encapsulate a positive electrode tab, a negative electrode tab, a current collector, an electrolyte solution and the like in a heat-sealing manner. The electrolyte solution consists of $LiPF_6$ as an electrolyte and EC/DEC/DMC or the like as a solvent.

Due to factors like poor heat sealing and burrs on the positive and negative electrode tabs, the electrolyte solution may leak into the aluminum-plastic composite film, and lithium ions in the electrolyte may be in contact with the aluminum foil in the aluminum-plastic composite film. Meanwhile, if the burrs on the negative electrode tab are in contact with the aluminum foil in the aluminum-plastic composite film, a short circuit may occur. In the aluminum-plastic composite film, the aluminum foil which is in contact with the lithium ions in the electrolyte will be corroded to form a Li—Al alloy. Since the Li—Al alloy is firm and hard in nature, the aluminum-plastic composite film of the outer packaging of the lithium-ion batteries may be broken by a very small impact force. In this case, the sealed electrolyte solution leaks out of a hole formed due to the broken aluminum-plastic composite film, and dissolves the periphery. The corrosion and leakage will seriously affect the safety of the lithium-ion batteries.

In addition, the hard pack materials for the lithium-ion batteries are non-heat-treated 3003 or 3004 aluminum alloys, which have high rigidity due to a Mn content of 1%-1.5%. These alloys have poor deep drawing formability compared to the heat-treated 8021 or 8079 aluminum alloys. The 3004 aluminum alloy cannot be subjected to deep drawing forming even when they are calendered to a thickness of 20-100 μm. However, it is known that a non-heat-treated 3004 aluminum alloy containing Mg alloy is not easy to form a Li alloy with a lithium-containing electrolyte solution. In addition, it is widely known that the 5052 aluminum alloy with a content of Mg at 2.2%-5% and a content of Fe at 0.4% is also not easy to produce Li alloy, but because the 5052 aluminum alloy contains 0.1% of Zn and 0.15%-0.35% of Cr, 5052 aluminum alloy has very high rigidity and it is very difficult to use 5052 aluminum alloy alone for producing a foil of 20-100 μm, and even if a foil can be formed, its formability is worse than that of a 3004 aluminum foil, thus cannot be used in the aluminum-plastic composite film.

SUMMARY

In view of this, the present invention is intended to provide an outer packaging material for a battery apparatus and a battery, so as to solve the existing problems of poor deep drawing and poor resistance to electrolyte solution corrosion in existing aluminum-plastic films.

For the above purpose, the present invention adopts the following technical schemes:

The present invention provides an outer packaging material for a battery apparatus, comprising a substrate layer, a first bonding layer, a barrier layer, a second bonding layer and a hot-melt connecting layer, wherein the first bonding layer is disposed between the substrate layer and the barrier layer; the second bonding layer is disposed between the barrier layer and the hot-melt connecting layer; the barrier layer consists of an aluminum alloy foil, and the aluminum alloy foil consists of one or more layers; the aluminum alloy foil comprises 1.2% or more of Fe and 1% or more of Mg by mass percentage; after the aluminum alloy foil is annealed, a large amount of Mg is precipitated from the aluminum alloy foil, and a ratio of precipitated Mg to precipitated Al is 2-4.

Furthermore, the aluminum alloy foil also comprises: 0.01%-0.2% of Si, 0.02%-0.06% of Sb, 0.01% or less of Mn, 0.03% or less of Zn and 0.01% or less of Cr by mass percentage.

Further, the aluminum alloy foil comprises 1%-2% mass percentage of Mg.

Further, the aluminum alloy foil comprises 1.2%-2% mass percentage of Fe.

Further, the aluminum alloy foil has an average particle size of 10 μm or less.

Preferably, the aluminum alloy foil has an average particle size of 5 μm or less.

Further, 90% or more of the particles of the aluminum alloy foil have a particle size in a range of 0.01-30 μm.

Preferably, 90% or more of the particles of the aluminum alloy foil have a particle size in a range of 0.01-25 μm.

Even further, there are 70% or more of the particles of the aluminum alloy foil having a particle size smaller than an average particle size of the aluminum alloy foil.

Further, the aluminum alloy foil has a thickness of 20-100 μm.

Further, at least one surface of the barrier layer, which is compounded with the hot-melt connecting layer, is subjected to corrosion-resistant treatment with a corrosion-resistant agent to form a corrosion-resistant layer; the corrosion-resistant agent comprises: aminophenol, polyacrylic acid and a modified polyolefin; methods for the corrosion-resistant treatment include chromium nitrate treatment, chromium phosphate treatment and cerium treatment; the corrosion-resistant layer has a thickness of 2 μm or less.

Further, the hot-melt connecting layer consists of one or more layers of modified polypropylene, polypropylene or polyolefin, with a thickness of 20-120 μm.

The present invention also provides a battery comprising the outer packaging material for the battery apparatus according to any one of claims 1-9.

The present invention has the following beneficial effects:
1) The present invention provides an outer packaging material for a battery apparatus, which can effectively inhibit the formation of Li—Al alloy caused by short circuit between the aluminum-plastic composite film and a metal electrode tab by adding 1%-2% mass percentage of Mg, and improve the resistance of the aluminum-plastic composite film to the electrolyte solution;
2) The present invention provides an outer packaging material for a battery apparatus, wherein the barrier layer is prepared from different types of aluminum alloys by composite calendering, which not only improves the deep drawing formability and the corrosion resistance of the metal barrier layer, but also reduces the amount of the aluminum foil being used and thus lowers the cost;
3) The present invention provides an outer packaging material for a battery apparatus, which can refine internal crystals of the aluminum foil and increase the limit of forming depth by reducing the content of Si in the aluminum foil to 0.01%-0.2% mass percentage;
4) The present invention can refine internal crystals of the aluminum foil and increase the limit of forming depth by adding 0.02%-0.06% mass percentage of Sb.

BRIEF DESCRIPTION OF THE DRAWINGS

FIG. 1 is a structural schematic view of a separator for electrochemical apparatus according to some embodiments of the present invention;
wherein 1 is a substrate layer; 2 is a first bonding layer; 3 is a colored layer; 4 is a first corrosion-resistant layer; 5 is a barrier layer; 6 is a second corrosion-resistant layer; 7 is a second bonding layer; and 8 is a hot-melt connecting layer.

DETAILED DESCRIPTION

The specific embodiments of the present invention are explained below in detail with reference to the attached drawings. It should be understood that the specific embodiments described herein are intended to illustrate and explain the present invention rather than limit the present invention.

A specific embodiment of the present invention provides an outer packaging material for a battery apparatus, comprising a substrate layer 1, a first bonding layer 2, a barrier layer 5, a second bonding layer 7 and a hot-melt connecting layer 8, wherein the first bonding layer 2 is disposed between the substrate layer 1 and the barrier layer 5; the second bonding layer 7 is disposed between the barrier layer 5 and the hot-melt connecting layer 8. The structure of the outer packaging material for the battery apparatus according to some embodiments of the present invention will be described in detail below.

Substrate Layer 1:

The substrate layer 1 is provided for serving as a substrate of a packaging material for a battery, and the substrate layer 1 is located as an outermost layer of the packaging material for the battery. The raw material for forming the substrate layer 1 is not particularly limited in the present invention, as long as it has at least the property of insulation so as to be served as a substrate. For example, the substrate layer can be made of resin, to which additives described below may also be added.

When the substrate layer 1 is made of the resin, for example, it may be a resin film product formed of the resin, or a resin-coated product. The resin film may be an unstretched film or a stretched film. The stretched film may be a uniaxially stretched film or a biaxially stretched film, preferably a biaxially stretched film. Examples of the method for producing the biaxially stretched film include, for example, a stepwise biaxial stretching method, a blown film method, and a simultaneous stretching method. Examples of the resin coating method include, for example, a roll coating method, a microgravure coating method, and an extrusion coating method.

Examples of the resin for forming the substrate layer 1 include resins such as polyester, polyamide, polyolefin, epoxy resin, acrylic resin, fluororesin, polyurethane, silicone resin and phenol-formaldehyde resin, and modified products of these resins. In addition, the resin for forming the substrate layer 1 can be a copolymer of these resins, a modified product of the copolymer, or a mixture of these resins.

In some embodiments of the present invention, polyester and polyamide are preferred.

Specific examples of polyester include, for example, polyethylene terephthalate, polybutylene terephthalate, polyethylene naphthalate, polyethylene isophthalate, and copolymerized polyester. In addition, examples of the copolymerized polyester include, for example, copolymerized polyester with ethylene terephthalate as the main repeat unit. Specific examples of the copolymerized polyester include, for example, copolymerized polyester obtained by polymerizing ethylene terephthalate as the main repeat unit with ethylene isophthalate (hereinafter, referred to as polyethylene(terephthalate/isophthalate)), polyethylene(terephthalate/adipate), polyethylene(terephthalate/sodium isophthalate), polyethylene(terephthalate/phenyl-dicarboxylate), polyethylene(terephthalate/decanedicarboxylate), and the like. Only one of these polyesters may be used, or 2 or more polyesters may be used in combination.

Specific examples of the polyamide include: aliphatic polyamides such as nylon 6, nylon 66, nylon 610, nylon 12, nylon 46, and copolymers of nylon 6 and nylon 66; hexamethylenediamine-isophthalic acid-terephthalic acid copolymerized polyamide containing a structural unit derived from terephthalic acid and/or isophthalic acid, such as nylon 6I, nylon 6T, nylon 6IT, and nylon 6I6T (I represents isophthalic acid, and T represents terephthalic acid), and cycloaliphatic polyamides such as polyamide MXD6 (polyamide PACM6 (polybis(4-aminocyclohexyl) methane azide amide); furthermore, polyamide copolymerized with a lactam component and an isocyanate component such as 4,4'-diphenylmethane-diisocyanate, and polyester amide copolymers or polyether ester amide copolymers as copolymers of a copolymerized polyamide and a polyester or a polyalkylene ether glycol. Only one of these polyamides may be used, or 2 or more of these polyamides may be used in combination.

In some embodiments of the present invention, the substrate layer 1 comprises at least one of a polyester film, a polyamide film and a polyolefin film; preferably, at least one of a stretched polyester film, a stretched polyamide film and a stretched polyolefin film; more preferably, at least one of a stretched polyethylene terephthalate film, a stretched polybutylene terephthalate film, a stretched nylon film and a stretched polypropylene film; and even more preferably, at least one of a biaxially stretched polyethylene terephthalate film, a biaxially stretched polybutylene terephthalate film, a biaxially stretched nylon film and a biaxially stretched polypropylene film.

The substrate layer 1 may consist of one layer, or 2 or more layers. When the substrate layer 1 consists of 2 or more layers, the substrate layer 1 may be a laminate in which resin films are laminated with an adhesive or the like, or may be a laminate in which 2 or more layers of resin films are formed by co-extrusion of the resin. In addition, a laminate with 2 or more layers of resin films formed by co-extrusion of the resin may be used as the substrate layer 1 in an unstretched state, or may be uniaxially or biaxially stretched for use as the substrate layer 1.

In the substrate layer 1, specific examples of the laminate with 2 or more layers of resin films include, for example, a laminate with a polyester film and a nylon film, a laminate with 2 or more layers of nylon films, a laminate with 2 or more layers of polyester films and the like, and preferably, a laminate with a stretched nylon film and a stretched polyester film, a laminate with 2 or more layers of stretched nylon films, and a laminate with 2 or more layers of stretched polyester films. For example, in the case where the substrate layer 1 is a laminate with 2 layers of resin films, the laminate is preferably a laminate with a polyester resin film and another polyester resin film, a laminate with a polyamide resin film and another polyamide resin film, or a laminate with a polyester resin film and a polyamide resin film, and more preferably, a laminate with a polyethylene terephthalate film and another polyethylene terephthalate film, a laminate with a nylon film and another nylon film, or a laminate with a polyethylene terephthalate film and a nylon film. In addition, since the polyester resin is less likely to change color when, for example, an electrolyte solution adheres to the surface, when the substrate layer 1 is a laminate with two or more layers of resin films, the polyester resin film is preferably located as the outermost layer of the substrate layer.

When the substrate layer 1 is a laminate with two or more layers of resin films, the two or more layers of resin films may also be laminated with an adhesive. Preferred adhesives include, for example, the same adhesive as that exemplified in the first bonding layer 2 described below. In addition, the method for laminating two or more layers of resin films is not particularly limited, and known methods can be used. Examples thereof include, for example, dry lamination, sandwich lamination, extrusion lamination, thermal lamination and the like, preferably dry lamination. When lamination is performed through dry lamination, polyurethane is preferably for use as the adhesive, and the adhesive may have a thickness of, for example, about 2-5 µm. In addition, an anchored coating may be formed on the resin films and then laminated. Examples of materials for the anchored coating include, for example, the same material as the adhesive exemplified in the first bonding layer 2 described below. Also, the anchored coating may have a thickness of, for example, about 0.01-1.0 µm.

In addition, additives such as a lubricant, a fire retardant, an anti-adhesion agent, an antioxidant, a light stabilizer, a tackifier and an antistatic agent may be present on a surface and/or inside the substrate layer 1. The additives may be used alone, or may also be used in a combination of two or more.

From the viewpoint of improving the formability of the packaging material for the battery, it is preferable to form a lubricant on the surface of the substrate layer. The lubricant is not particularly limited in the present invention, and preferably includes an amide-based lubricant. Specific examples of the amide-based lubricant include a saturated fatty acid amide, an unsaturated fatty acid amide, a substituted amide, a methylol amide, a saturated fatty acid bisamide, an unsaturated fatty acid bisamide, a fatty acid ester amide and an aromatic bisamide. Specific examples of the saturated fatty acid amide include, for example, lauramide, palmitamide, stearamide, behenamide, hydroxystearamide and the like. Specific examples of the unsaturated fatty acid amide include, for example, oleamide, erucamide and the like. Specific examples of the substituted amide include N-oleyl palmitamide, N-stearamide, N-stearamide, N-oleyl stearamide, and N-stearamide. Specific examples of the methylol amide include, for example, methylol stearamide. Specific examples of the saturated fatty acid bisamide include methylene-bis-stearamide, ethylene-bis-caprylamide, ethylene-bis-lauramide, ethylene-bis-stearamide, ethylene-bis-hydroxystearamide, ethylene-bis-behenamide, hexamethylene-bis-stearamide, hexamethylene-bis-behenamide, hexamethylene-hydroxystearamide, N,N'-distearyladipamide, N,N'-distearylsebacamide and the like.

Specific examples of the unsaturated fatty acid bisamide include ethylene-bis-oleamide, ethylene-bis-erucamide, hexamethylene-bis-oleamide, N,N'-dioleyladipamide, and N,N'-dioleylsebacamide. Specific examples of the fatty acid ester amide include, for example, stearamide ethyl stearate. Specific examples of the aromatic bisamide include, for example, m-xylylene-bis-stearamide, m-xylylene-bis-hydroxystearamide, N,N'-distearylisophthalamide and the like. The lubricants may be used alone, or may also be used in a combination of two or more.

When a lubricant is present on the surface of the substrate layer 1, the coating amount is not particularly limited in the present invention, and examples thereof preferably include about 3 mg/m$^2$ or more and more preferably about 4-30 mg/m$^2$. The lubricant present on the surface of the substrate layer may be a lubricant that leaks out of the lubricant contained in the resins constituting the substrate layer, or may be a lubricant coated on the surface of the substrate layer.

The thickness of the substrate layer is not particularly limited in the present invention, as long as it functions as a substrate, and examples of the thickness include, for example, about 3-50 μm, and preferably about 10-35 μm. When the substrate layer is a laminate with 2 or more layers of resin films, the thickness of each resin film constituting each layer is preferably about 2-30 μm.

First Bonding Layer 2:

The first bonding layer 2 is a layer disposed between the substrate layer 1 and the barrier layer 5 as needed for the purpose of improving adhesion therebetween.

The first bonding layer 2 is formed of an adhesive capable of bonding the substrate layer 1 and the barrier layer 5. The adhesive used for forming the bonding layer 2 is not limited in the present invention, and may be, for example, a bicomponent curable adhesive (bicomponent adhesive), and in addition, may also be a monocomponent curable adhesive (monocomponent adhesive). Moreover, the adhesive used for forming the first bonding layer 2 may be any of a chemical reaction type, a solvent volatilization type, a hot-melt type, a hot-press type and the like. In addition, the first bonding layer 2 may consist of one or more layers.

Specific examples of adhesive components contained in the adhesive include polyesters such as polyethylene terephthalate, polybutylene terephthalate, polyethylene naphthalate, polyethylene isophthalate and copolymerized polyester; polyether; polyurethane; epoxy resin; phenol-formaldehyde resin; polyamides such as nylon 6, nylon 66, nylon 12, and copolymerized polyamide; polyolefin-based resins such as polyolefin, cyclic polyolefin, acid-modified polyolefin and acid-modified cyclic polyolefin; polyvinyl acetate; cellulose; (meth)acrylic resins; polyimide; polycarbonate; amino resins such as urea resin and melamine resin; rubbers such as chloroprene rubber, nitrile rubber and styrene-butadiene rubber; silicone resins, and the like. Only one of these adhesive components may be used, or 2 or more of these adhesive components may be used in combination. Among these adhesive components, the polyurethane adhesive is preferable.

Examples of the polyurethane adhesive include, for example, a polyurethane adhesive comprising a main agent containing a polyol compound and a curing agent containing an isocyanate compound.

In addition, other components are allowed for addition into the first bonding layer 2 as long as they do not interfere with the adhesion, including a colorant, a thermoplastic elastomer, a tackifier, a filler and the like. The packaging material for the battery can be colored by adding a colorant in the first bonding layer 2. Known colorants such as pigments and dyes can be used. In addition, the colorant may be used alone, or may also be used in a combination of two or more.

The pigment is not particularly limited as long as the adhesion range of the first bonding layer 2 is not impaired. Examples of organic pigment include, for example, an azo-type pigment, a phthalocyanine-type pigment, a quinacridone-type pigment, an anthraquinone-type pigment, a dioxazine-type pigment, a thioindigo-type pigment, a perylene-type pigment, an isoindoline-type pigment and the like, and examples of inorganic pigment include, for example, a carbon black-type pigment, a titanium oxide-type pigment, a cadmium-type pigment, a lead-type pigment, an isoindoline-type pigment and the like. Among these colorants, carbon black-type pigment is preferable, for example, in order to make the appearance of the packaging material for the battery black.

The average particle size of the pigment is not particularly limited, and examples include, for example, about 0.05-5 μm, and preferably about 0.08-2 μm. In addition, the average particle size of the pigment is a median particle size measured by a laser diffraction/scattering particle size distribution measuring apparatus.

The content of the pigment in the first bonding layer 2 is not particularly limited as long as the packaging material for the battery is colored, and examples include, for example, about 5%-60%, and preferably 10%-40% of the first bonding layer 2.

The thickness of the bonding layer 2 is not particularly limited as long as the substrate layer 1 and the barrier layer 5 can be bonded to each other; examples of the lower limit of the thickness include, for example, about 1 μm or more or about 2 μm or more, examples of the upper limit of the thickness include, for example, about 10 μm or less or about 5 μm or less, and examples of a preferable range of the thickness include, for example, about 1-10 μm or about 1-5 μm.

Colored Layer 3:

In some embodiments of the present invention, a colored layer 3 is also included.

The colored layer 3 is a layer disposed between the substrate layer 1 and the barrier layer 5 according to practical need. When the first bonding layer 2 is provided, the colored layer 3 may also be disposed between the substrate layer 1 and the first bonding layer 2, or between the first bonding layer 2 and the barrier layer 5. In addition, the colored layer 3 may also be disposed outside the substrate layer 1. The packaging material for the battery may be colored by providing the colored layer 3.

The colored layer 3 may be formed by, for example, coating the surface of the substrate layer 1, the surface of the first bonding layer 2, or the surface of the barrier layer 5 with an ink containing a colorant. Known colorants such as pigments and dyes can be used. In addition, only one of the colorants may be used, or 2 or more of these colorants may be used in combination.

Specific examples of the colorant contained in the colored layer 3 may be the same colorant as that exemplified for the first bonding layer 2.

Barrier Layer 5:

In the outer packaging material for the battery, the barrier layer 5 is a layer at least capable of preventing moisture penetration.

In some embodiments of the present invention, the barrier layer 5 consists of an aluminum alloy foil, and the aluminum alloy foil consists of one or more layers; the aluminum alloy foil comprises 1.2% or more of Fe and 1% or more of Mg by mass percentage; after the aluminum alloy foil is annealed, a large amount of Mg is precipitated from the aluminum alloy foil, and a ratio of precipitated Mg to precipitated Al is 2-4.

Specifically, the aluminum alloy foil also comprises: 0.01%-0.2% of Si, 0.02%-0.06% of Sb, 0.01% or less of Mn, 0.03% or less of Zn and 0.01% or less of Cr in mass percentage.

Further, the aluminum alloy foil comprises 1%-2% mass percentage of Mg.

Further, the aluminum alloy foil comprises 1.2%-2% mass percentage of Fe.

Further, the aluminum alloy foil has an average particle size of 10 µm or less.

Preferably, the aluminum alloy foil has an average particle size of 5 µm or less.

Further, 90% or more of the particles of the aluminum alloy foil have a particle size in a range of 0.01-30 µm.

Preferably, 90% or more of the particles of the aluminum alloy foil have a particle size in a range of 0.01-25 µm.

Even further, there are 70% or more of the particles of the aluminum alloy foil having a particle size smaller than an average particle size of the aluminum alloy foil.

Further, the aluminum alloy foil has a thickness of 20-100 µm.

In some embodiments of the present invention, the aluminum alloy foil may be a composite layer with 2 or more layers, and the composite layer may be calendered in vacuum, or may be calendered in a normal environment. Generally, the composite layer is not subjected to any special treatment before being calendered to a desired thickness.

First corrosion-resistant layer 4/Second corrosion-resistant layer 6:

When the barrier layer 5 is a metal foil, a corrosion-resistant film is preferably adhered to at least one side of the barrier layer 5 opposite to the substrate layer 1 to prevent problems such as dissolution and corrosion. Optionally, corrosion-resistant films may adhere to both sides of the barrier layer 5 respectively. The corrosion-resistant film refers to, for example, an anti-corrosion thin film formed on the barrier layer 5 by treating a surface of the barrier layer 5 via hydrothermal treatment (such as boehmite treatment), chemical treatment, anodic oxidation treatment, electroplating treatment such as nickel or chromium treatment, or anti-corrosion coating treatment. Any one of the treatments for forming the corrosion-resistant film may be performed alone, or 2 or more of the treatments may be performed in combination. The treated film is not limited to one layer, and may also be a combination of more than one layer. Among these treatments, the hydrothermal treatment and the anodic oxidation treatment are treatments in which the surface of the metal foil is dissolved by a treating agent to form a metal compound having excellent corrosion resistance. In addition, these treatments are sometimes included within the definition of chemical treatment. When a general situation where the barrier layer 5 comprises at least one corrosion-resistant film, the barrier layer 5 is defined to include also said at least one corrosion-resistant film.

When the packaging material for the battery is formed, the corrosion-resistant film prevents the separation of the barrier layer 5 (for example, aluminum alloy foil) and the substrate layer 1, and avoids hydrogen fluoride generated by the reaction of electrolyte and moisture, thereby preventing dissolution and corrosion of the surface of the barrier layer 5, particularly, dissolution and corrosion of aluminum oxide present on the surface of the barrier layer 5 when the barrier layer is an aluminum alloy foil, and improving adhesion (wettability) on the surface of the barrier layer 5, which has an effect of preventing the separation of the substrate layer 1 and the barrier layer 5 during heat sealing and formation.

Many types of corrosion-resistant films formed by chemical treatment are known, and examples thereof include, for example, corrosion-resistant films containing at least one of a phosphate, a chromate, a fluoride, a triazine thiol compound, a rare earth oxide and the like.

Examples of chemical treatments using a phosphate or a chromate mainly include, for example, chrome plating treatment with chromic acids, chrome plating treatment with phosphoric acids, phosphoric acid-chromate treatment, chromate treatment, and the like, and examples of chromium compound used in these treatments mainly include, for example, chromium nitrate, chromium fluoride, chromium sulfate, chromium acetate, chromium oxalate, chromium biphosphate, chromium acetoacetate, chromium chloride, chromium potassium sulfate and the like. Examples of phosphorus compound used in these treatments mainly include, for example, sodium phosphate, potassium phosphate, ammonium phosphate, polyphosphoric acid and the like. Examples of chromate treatments mainly include chromate etching treatment, chromate electrolytic treatment, chromate coating treatment and the like, and preferably chromate coating treatment. In the chromate coating treatment, at least the inner side of the barrier layer 5 (for example, the aluminum alloy foil) is first subjected to a degreasing treatment by common methods such as alkali immersion, electrolytic cleaning, acid cleaning, electrolytic acid cleaning, oxygen activation and the like. Then, the degreased surface is coated by treatment solution via a known coating method such as roll coating, gravure coating, or immersion using a treatment solution, and then dried. The treatment solution includes a treatment solution mainly containing a metallic phosphate such as Cr (chromium) phosphate, Ti (titanium) phosphate, Zr (zirconium) phosphate, or Zn (zinc) phosphate and a mixture of these metallic salts, a treatment solution mainly containing a non-metallic phosphate and a mixture of these non-metallic salts, or a treatment solution containing a mixture of the above materials and a synthetic resin. Various solvents such as water, alcohol solvents, hydrocarbon solvents, ketone solvents, ester solvents, and ether solvents, and preferably water, may be used for the treatment solution. In addition, a water-soluble macromolecule such as phenol or polyacrylic acid can be selected as a resin component used herein.

As an example of the corrosion-resistant film, a phosphoric acid in which particulate substance of a metallic oxide such as aluminum oxide, titanium oxide, cerium oxide and tin oxide, or barium sulfate is dispersed, is applied to the surface of the barrier layer 5, sintered at 150° C. or greater to form the corrosion-resistant film.

Other examples of the corrosion-resistant film mainly include a thin film formed by anti-corrosion coating treatment containing at least one component selected from a rare-earth element oxide sol, an anionic polymer and a cationic polymer. Coating agent may further contain phosphoric acid or a phosphate, or a crosslinking agent for crosslinking polymer. In the rare-earth element oxide sol, fine particles (for example, particles having an average particle size of 100 nm or less) of a rare-earth element oxide are dispersed in a liquid dispersion medium. Examples of rare-earth element oxide mainly include cerium oxide, yttrium oxide, neodymium oxide, lanthanum oxide and the like, and cerium oxide is preferred from the viewpoint of further improving adhesion. Only one of the rare-earth element oxides contained in the corrosion-resistant film may be used, 2 or more of the rare-earth element oxides may be used in combination. For example, various solvents such as water, alcohol solvents, hydrocarbon solvents, ketone solvents, ester solvents, and ether solvents, and preferably water, may be used as the liquid dispersion medium of the rare-earth element oxide sol. Examples of the cationic polymer mainly include polyethyleneimine, an ionic polymer complex composed of polyethyleneimine and a polymer having carboxylic acid, a primary amine-grafted acrylic resin in which a primary amine is grafted to an acrylic backbone, polyallylamine or a derivative thereof, and aminophenol. In addition, the anionic polymer is preferably a copolymer mainly containing poly(meth)acrylic acid or a salt thereof, or (meth)acrylic acid or a salt thereof. The crosslinking agent is preferably at least one selected from a compound having any functional group of an isocyanate group, a glycidyl group, a carboxyl group and an oxazoline group, and a silane coupling agent. The phosphoric acid or phosphate is preferably condensed phosphoric acid or a condensed phosphate.

The corrosion-resistant film may be further laminated with at least one of a cationic polymer and an anionic polymer to form a laminated structure, if necessary. Examples of the cationic polymer and the anionic polymer mainly include the above-mentioned polymers.

The thickness of the corrosion-resistant film is not particularly limited, but is preferably 1 nm to 2.0 µm, and more preferably 1 nm to 1 µm, from the viewpoint of the cohesion of the corrosion-resistant film and the adhesion to the barrier layer 5 or a hot-melt resin layer.

The chemical treatment is conducted in the following manner: a solution containing a compound used for the formation of a corrosion-resistant film is applied to the surface of the barrier layer 5 through bar coating, roll coating, gravure coating, immersion or the like, and then the barrier layer 5 is heated to 70-200° C. In addition, the barrier layer 5 may also be subjected to degreasing through alkali immersion, electrolytic cleaning, acid cleaning, electrolytic acid cleaning or the like before the barrier layer 5 is subjected to the chemical treatment. When degreasing treatment is performed as described above, the chemical treatment on the surface of the barrier layer 5 can be conducted more efficiently.

Second Bonding Layer 7:

The second bonding layer 7 is an intermediate layer disposed to firmly adhere the barrier layer 5 and the hot-melt connecting layer 8.

The second bonding layer 7 is formed of a resin capable of adhering the barrier layer 5 and the hot-melt connecting layer 8. As the resin used for forming the second bonding layer 7, a resin with the same adhesive mechanism, the same adhesive composition and the like as those of the adhesive exemplified in the first bonding layer 2 may be used. In addition, polyolefin-based resins such as polyolefin, cyclic polyolefin, carboxylic acid-modified polyolefin, and carboxylic acid-modified cyclic polyolefin exemplified in the hot-melt connecting layer 8 as described below may also be used. From the viewpoint of improving the adhesion between the barrier layer 5 and the hot-melt connecting layer 8, the polyolefin is preferably a carboxylic acid-modified polyolefin, and more preferably a carboxylic acid-modified polypropylene. That is, the resin forming the second bonding layer 7 may or may not contain a polyolefin backbone, and preferably contains a polyolefin backbone. Whether the resin forming the second bonding layer 7 contains a polyolefin backbone or not can be analyzed by, for example, infrared spectrophotometry, gas chromatography-mass spectrometry, or the like, and the analysis method is not particularly limited.

The second bonding layer 7 may also be a cured product of a resin composition containing an acid-modified polyolefin and a curing agent, with a view of reducing the thickness of the packaging material for the battery and improving the forming stability thereof. The acid-modified polyolefin is preferably the same as the carboxylic acid-modified polyolefin and the carboxylic acid-modified cyclic polyolefin exemplified in the hot-melt connecting layer.

The curing agent is not particularly limited as long as it is a curing agent for curing the acid-modified polyolefin. Examples of the curing agent include, for example, an epoxy curing agent, a polyfunctional isocyanate curing agent, a carbodiimide curing agent, an oxazoline curing agent and the like.

The epoxy curing agent is not particularly limited as long as it is a compound having at least one epoxy group. Examples of the epoxy curing agent include, for example, epoxy resins such as bisphenol A diglycidyl ether, modified bisphenol A diglycidyl ether, novolak glycidyl ether, glycerol polyglycidyl ether and polyglycerol polyglycidyl ether.

The polyfunctional isocyanate curing agent is not particularly limited as long as it is a compound having two or more isocyanate groups in the molecule. Examples of the polyfunctional isocyanate curing agent include, for example, isophorone diisocyanate (IPDI), hexamethylene diisocyanate (HDI), toluene diisocyanate (TDI), diphenylmethane diisocyanate (MDI), components after polymerization or addition of the above substances, and reactants of such mixtures with other polymers.

The carbodiimide curing agent is not particularly limited as long as it is a compound having at least one carbodiimide group (—N=C=N—) in the molecule. The carbodiimide curing agent is preferably a polycarbodiimide compound having at least two or more carbodiimide groups.

The oxazoline curing agent is not particularly limited as long as it is a compound having an oxazoline backbone. Examples of the oxazoline curing agent include, for example, the epoxy series manufactured by Nippon Shokubai Co., Ltd.

The curing agent may also be composed of two or more compounds, from the viewpoint of improving the adhesion between the second bonding layer 7 and the hot-melt connecting layer 8.

The thickness of the second bonding layer 7 is not particularly limited as long as it achieves the required functions of the second bonding layer 7. However, when the adhesive exemplified in the first bonding layer 2 is used, the thickness is preferably, for example, about 1-10 µm, and more preferably about 1-5 µm. When the resin exemplified in the hot-melt connecting layer 8 is used, the thickness is preferably, for example, about 2-50 µm, and more preferably about 10-40 µm. If the cured product containing the acid-modified polyolefin and the curing agent is used, the thickness is preferably, for example, 30 µm or less, more preferably about 0.1-20 µm, and even more preferably about 0.5-5 µm. It should be noted that, when the second bonding layer 7 is a cured product of a resin composition containing the acid-modified polyolefin and the curing agent, the second bonding layer 7 can be formed by applying the resin composition and then curing the resin composition by heating or the like.

Hot-Melt Connecting Layer 8:

The hot-melt connecting layer 8 is the innermost layer, and is a layer (a heat-sealing layer) that exerts the function of a hot-melting resin layer to seal the battery elements after being connected end-to-end through hot-melting to enclose the batter elements when the battery is assembled.

The resin forming the hot-melt connecting layer 8 is not particularly limited as long as it can be hot-melted, and a resin containing a polyolefin backbone such as polyolefin or acid-modified polyolefin is preferred.

Specific examples of polyolefin include, for example, polyethylene such as low-density polyethylene, medium-density polyethylene, high-density polyethylene, and linear low-density polyethylene; ethylene-α-olefin copolymers; polypropylene such as homopolypropylene, block copolymers of polypropylene (e.g., block copolymers of propylene and ethylene), and random copolymers of polypropylene (e.g., random copolymers of propylene and ethylene); propylene-α-olefin copolymers; terpolymers of ethylene-butene-propylene, and the like. Among them, polypropylene is preferred. The polyolefin resin used as a copolymer may be a block copolymer, or may also be a random copolymer. Only one of these polyolefin-based resins may be used, or 2 or more of these polyolefin-based resins may be used in combination.

The acid-modified polyolefin is a polymer modified by block polymerization or graft polymerization of polyolefins with an acid component. Examples of the acid-modified polyolefin include the above polyolefin, a copolymer obtained by copolymerizing a polar molecule such as acrylic acid or methacrylic acid with the above polyolefin, a polymer such as a crosslinked polyolefin, or the like. In addition, examples of the acid component used for acid modification include, for example, carboxylic acids and sulfonic acids such as maleic acid, acrylic acid, itaconic acid, crotonic acid, maleic anhydride, and itaconic anhydride, and anhydride thereof.

The hot-melt connecting layer 8 may consist of one resin alone, or may also consist of a polymer blend in which two or more resins are combined. Moreover, the hot-melt connecting layer 8 may consist of only 1 layer, or may also consist of two or more layers of the same or different resins.

The hot-melt connecting layer 8 may also contain a slipping agent or the like according to practical need. When the hot-melt connecting layer 8 contains a slipping agent, the formability of the outer packaging material for the battery can be improved. The slipping agent is not particularly limited, and may be selected and used according to common technical knowledge. Only one of the slipping agents may be used, or two or more slipping agents may be used in combination.

The slipping agent is not particularly limited, and preferably includes an amide-based slipping agent. Only one of the slipping agents may be used, or two or more of the slipping agents may be used in combination.

When a lubricant is present on the surface of the hot-melt connecting layer 8, the amount of the lubricant is not particularly limited. However, from the viewpoint of improving the formability of the material for the battery packaging, the amount of lubricant is preferably, 10-50 mg/m$^2$, and more preferably 15-40 mg/m$^2$.

The slipping agent present on the surface of the hot-melt connecting layer 8 may be a slipping agent that leaks out of the resins constituting the hot-melt connecting layer 8, or may also be a slipping agent applied to the surface of the hot-melt connecting layer 8.

The thickness of the hot-melt connecting layer 8 is not particularly limited as long as it satisfies the performance of the hot-melt resin layers after being connected end-to-end through hot-melting to enclose the battery elements and thus exerts the function of sealing the battery elements. The thickness is, for example, about 100 μm or less, and preferably about 15-85 μm.

The hot-melt connecting layer 8 may also contain a component such as an antioxidant or the like according to practical need. The hot-melt connecting layer 8 containing an antioxidant can suppress thermal deterioration during the manufacturing process. The type of antioxidant is not particularly limited, and may be selected and used according to common technical knowledge. Only one antioxidant may be used, or two or more antioxidants may be used in combination.

The present invention is described in detail below by the description of examples.

In the following examples and comparative examples, the performance parameters were determined as follows:

(1) Alloy composition was measured by photoelectric emission spectrochemical analysis in accordance with the JIS Z 2611 standard.

(2) The particle size of the crystals was observed by EBSD (electron backscatter diffraction) after slicing the electrolytic grinding material.

(3) The contents of Mg, Fe and Al on the surface of the aluminum alloy foil could be measured by X-ray photoelectron spectroscopy (XPS).

(4) Tensile strength

The tensile strength was measured using a tensile test apparatus after the aluminum-plastic composite film was prepared into a straight strip, with a sample size of 100×15 mm at the tensile rate of 50 mm/min.

(5) Forming depth

The forming size was 80×70 mm, the pressing pressure was 0.8 MPa, the radius of the corner was r=1.0 mm, the radius of the convex edge angle was r=1.0 mm, and the gap between the convex and concave portions was 0.51 mm.

(6) Test of corrosion resistance

The aluminum alloy was used as the anode, and the Li alloy was used as the cathode. An external power supply was used for charging with the charging voltage at 1 V, and the solvent was a 1 mol/L of $LiPF_6$ EC/DEC/DMC lithium-ion battery electrolyte solution. After charging for 3 h, whether the aluminum alloy was corroded or not was verified by checking whether a current was generated or not through a potentiometer and visually observing whether the Li—Al alloy was generated on the anode or not.

Example 1

Substrate Layer:

A 2-stage asynchronous biaxially stretched nylon film with a thickness of 25 μm was used.

Aluminum Alloy Foil Layer:

A one-layer aluminum alloy foil layer, with a thickness of 40 μm, containing 1% of Mg, 1.2% of Fe, 0.1% of Si, and 0.02% of Sb by mass percentage was used, and after annealing, the precipitation ratio of Mg to Al on the surface of the aluminum alloy foil was 2.

The substrate layer was subjected to a corona treatment, and the aluminum alloy foil layer was rolled with dry iron on the substrate layer. The dull side of the aluminum alloy foil was coated with a bicomponent polyurethane adhesive (a polyol compound and an aromatic isocyanate compound) to form the first bonding layer 2 (3 μm) on the aluminum alloy foil. The first bonding layer 2 on the dull side of the aluminum alloy foil was compounded with the substrate layer 1, and then aging at 60° C. for 3 days to form a semi-finished product consisting of substrate layer (25 μm), first bonding layer (3 μm), and aluminum alloy foil layer (40 μm). Both sides of the aluminum alloy foil layer were already chemically treated in advance.

An anhydrous maleic anhydride-modified polypropylene resin with a weight-average molecular mass of 70,000, a melting point of 145° C. and an acid value of 4.5 mg KOH/g was dissolved in water, and then an epoxy resin and a methanesulfonic acid resin was added, to form a bonding resin. The shiny side of the aluminum alloy foil layer in the semi-finished product was coated with the bonding resin aqueous solution, and then dried at a drying temperature of 150° C. to form the second bonding layer 7.

An internal hot-melt connecting resin (CPP) as the hot-melt connecting layer 8 was composed of three layers, including:
- a resin layer in contact with the second bonding layer 7: a layer composed of randomly copolymerized polypropylene with a melting point of 162° C. and an melt flow rate (MFR) (230° C.) of 5.5 g/10 min;
- an intermediate resin layer: a mixture layer formed of, by weight percentage, 50% of a block copolymerized polypropylene with a melting point of 162° C. and an MFR (230° C.) of 2 g/10 min, 20% of a randomly copolymerized polypropylene with a melting point of 155° C. and an MFR (230° C.) of 5 g/10 min, 20% of a polymer elastomer composed of propylene and butene with a melting point of 160° C., an MFR (230° C.) of 9.5 g/10 min and a density of 0.87 g/cm$^3$, and 10% of a non-crystalline propylene-based elastomer with an MFR (230° C.) of 3 g/10 min; and
- an innermost resin layer: a layer composed of a randomly copolymerized polypropylene with a melting point of 145° C. and an MFR (230° C.) of 12 g/10 min;
- wherein a thickness ratio of the three-layer internal hot-melt connecting resin from the resin layer in contact with the second bonding layer 7 to the innermost resin layer was 3:6:1.

The surface of the 40-μm CPP film was subjected to a corona treatment, and then heat-compounded with the second bonding layer 7 at 160° C., followed by thermal treatment at 160° C. for 30 s. Thus, a composite-finished product comprising substrate layer (25 μm), first bonding layer (3 μm), aluminum alloy foil layer (40 μm), second bonding layer (1.5 μm), and hot-melt connecting layer (40 μm) was formed.

Meanwhile, the surface of the substrate layer was coated with a Slip agent (slipping agent). The slip film layer was a 10% (concentration) erucamide solution, and after drying at a certain temperature, the coating amount of erucamide on the surface of the substrate layer was 10 mg/m$^2$.

Example 2

Substrate Layer:

A 2-stage asynchronous biaxially stretched polybutylene terephthalate (PBT) film with a thickness of 25 μm was used as the substrate layer.

Aluminum Alloy Foil Layer:

A one-layer aluminum alloy foil layer, with a thickness of 40 μm, containing 1.5% of Mg, 1.5% of Fe, 0.1% of Si, and 0.02% of Sb by mass percentage was used, and after annealing, the precipitation ratio of Mg to Al on the surface of the aluminum alloy foil was 3.1.

A composite-finished product of substrate layer (25 μm), first bonding layer (3 μm), aluminum alloy foil layer (40 μm), second bonding layer (1.5 μm), and hot-melt connecting layer (40 μm) was formed using the method in Example 1. Meanwhile, the surface of the substrate layer was also coated with the same amount of the Slip agent as in Example 1.

Example 3

Substrate Layer:

A 2-stage asynchronous biaxially stretched nylon film with a thickness of 25 μm was used as the substrate layer.

Aluminum Alloy Foil Layer:

A one-layer aluminum alloy foil layer, with a thickness of 40 μm, containing 2% of Mg, 2% of Fe, 0.1% of Si, and 0.02% of Sb by mass percentage was used, and after annealing, the precipitation ratio of Mg to Al on the surface of the aluminum alloy foil was 4.

A composite-finished product of substrate layer (25 μm), first bonding layer (3 μm), aluminum alloy foil layer (40 μm), second bonding layer (1.5 μm), and hot-melt connecting layer (40 μm) was formed using the method in Example 1. Meanwhile, the surface of the substrate layer was also coated with the same amount of the Slip agent as in Example 1.

Example 4

Substrate Layer:

A 2-stage asynchronous biaxially stretched polybutylene terephthalate (PBT) film with a thickness of 25 μm was used as the substrate layer.

Aluminum Alloy Foil Layer:

A 3-layer composite aluminum alloy foil comprising a layer of Mg—Al alloy foil, a layer of 8021 Al foil, and another layer of Mg—Al alloy foil was used. The intermediate layer, i.e. the 8021 Al foil, contained 1.5% of Fe and 0.08% of Si by mass percentage. Each of both layers of Mg—Al alloy foil that were in contact with the substrate layer 1 and the hot-melt connecting layer 8 respectively had a thickness of 10 μm, and each contained 1.5% of Mg, 1.5% of Fe, 0.01% of Si and 0.04% of Sb by mass percentage; and after annealing, the precipitation ratio of Mg to Al on the surface of the aluminum alloy foil was 3.1.

The substrate layer was subjected to a corona treatment, and the aluminum alloy foil layer was rolled with dry iron on the substrate layer. One side of the aluminum alloy foil was coated with a bicomponent polyurethane adhesive (a polyester polyol compound and an aromatic isocyanate compound) to form the first bonding layer 2 (3 μm) on the aluminum alloy foil. The first bonding layer 2 on one side of the aluminum alloy foil was compounded with the substrate layer 1, and then aging at 60° C. for 3 days to form a semi-finished product consisting of substrate layer (25 μm), bonding layer (3 μm), and aluminum alloy foil layer (40 μm). Both sides of the aluminum alloy foil layer were already chemically treated in advance to form the corrosion-resistant layers 4 and 6.

The hot-melt resin used for the second bonding layer 7 was anhydrous maleic anhydride-modified polypropylene, and the second bonding layer 7 with a thickness of 20 μm was formed on a treated surface of the aluminum alloy foil. Further, the second bonding layer was compounded with a hot-melt connecting resin with a thickness of 20 μm. The second bonding layer 7 and the hot-melt connecting layer 8 were compounded on another side of the aluminum alloy foil by melting and co-extruding. The second bonding layer 7 is a mixture consisting of 60% (by weight percentage) of anhydrous maleic anhydride-modified randomly copolymerized polypropylene (the modification degree of the randomly copolymerized polypropylene by the anhydrous maleic anhydride was 10%) with a melting point of 140° C. and an MFR (230° C.) of 5 g/10 min, 24% (by weight percentage) of a copolymer elastomer of propylene and butene with a melting point of 160° C., an MFR (230° C.) of 2.6 g/10 min and a density of 0.87 g/cm³, 8% (by weight percentage) of a crystalline copolymer elastomer of ethylene and propylene with a melting point of 130° C., an MFR (230° C.) of 9.5 g/10 min and a density of 0.91 g/cm³, and 8% (by weight percentage) of a low-density polyethylene with a melting point of 105° C. and an MFR (230° C.) of 12 g/10 min.

An internal hot-melt connecting resin as the hot-melt connecting layer 8 was composed of two layers, including:
- a resin layer in contact with the second bonding layer 7:
  - a mixture layer formed, by weight percentage, of 62% of randomly copolymerized polypropylene with a melting point of 155° C. and an MFR (230° C.) of 4 g/10 min, 33% of a non-crystalline propylene-based elastomer, and 5% of a low-density polyethylene with a melting point of 110° C. and an MFR (230° C.) of 7.5 g/10 m; and
- an innermost resin layer: a layer composed of randomly copolymerized polypropylene with a melting point of 155° C. and an MFR (230° C.) of 15 g/10 m;
- wherein a thickness ratio of the resin layer in contact with the second bonding layer 7 to the innermost resin layer was 8:2.

After the semi-finished product consisting of substrate layer (25 μm), first bonding layer (3 μm), and aluminum alloy foil layer (40 μm) was compounded with the second bonding layer 7 and the hot-melt connecting layer 8, a thermal treatment was performed at 180° C. for 2 s.

Thus, a composite-finished product comprising substrate layer (25 μm), first bonding layer (3 μm), aluminum alloy foil layer (40 μm), second bonding layer (20 μm), and hot-melt connecting layer (20 μm) was formed.

Meanwhile, the surface of the substrate layer was coated with the same amount of the Slip agent as in Example 1.

Example 5

Substrate Layer:
A 2-stage asynchronous biaxially stretched polybutylene terephthalate (PBT) film with a thickness of 25 μm was used as the substrate layer.
Aluminum Alloy Foil Layer:
A one-layer aluminum alloy foil layer, with a thickness of 100 μm, comprising 1.5% of Mg, 1.5% of Fe, 0.01% of Si, and 0.04% of Sb by mass percentage was used, and after annealing, the precipitation ratio of Mg to Al on the surface of the aluminum alloy foil was 3.

A composite-finished product comprising substrate layer (25 μm), first bonding layer (3 μm), aluminum alloy foil layer (100 μm), second bonding layer (1.5 μm), and hot-melt connecting layer (40 μm) was formed using the method in Example 1. Meanwhile, the surface of the substrate layer was also coated with the same amount of the Slip agent as in Example 1.

Example 6

Substrate Layer:
A 2-stage asynchronous biaxially stretched polyethylene terephthalate (PET) with a thickness of 12 μm and a 2-stage asynchronous biaxially stretched nylon with a thickness of 15 μm were used for the substrate layer. Specifically, one surface of the PET was subjected to a corona treatment in advance, and the corona-treated surface of the PET was coated with a bicomponent polyurethane adhesive (a polyol compound and an aromatic isocyanate compound) to form a first bonding layer (3 μm). The first bonding layer on the PET was compounded with the nylon which had been subjected to a corona treatment to form a composite substrate layer consisting of PET (12 μm), first bonding layer (3 μm), and nylon layer (15 μm).
Aluminum Alloy Foil Layer:
A 2-layer composite aluminum alloy foil of Mg—Al alloy foil and 8079 Al foil (in a thickness ratio of 1:9) was used, and the total thickness of the composite aluminum alloy foil was 40 μm. The Mg—Al alloy foil layer contained 1% of Mg, 1.5% of Fe, 0.1% of Si and 0.02% of Sb by mass percentage, and after annealing, the precipitation ratio of Mg to Al on the surface of the composite aluminum alloy foil was 2.1.

A side of the nylon layer of the composite substrate layer that was in contact with the 8079 Al foil of the composite aluminum alloy foil layer was subjected to a corona treatment in advance, and then aging at 60° C. for 3 days to form a semi-finished composite layer of PET (12 μm), first bonding layer (3 μm), nylon layer (15 μm), second bonding layer (3 μm), and aluminum alloy foil layer (40 μm).

The internal hot-melt connecting resin being the hot-melt connecting layer 8 was composed of 3 layers, including:
- a resin layer in contact with the aluminum alloy foil layer:
  - a mixture consisting of 60% (by weight percentage) of anhydrous maleic anhydride-modified randomly copolymerized polypropylene (the modification degree of the randomly copolymerized polypropylene by the anhydrous maleic anhydride was 10%) with a melting point of 140° C. and an MFR (230° C.) of 5 g/10 min, 24% (by weight percentage) of a copolymer elastomer of propylene and butene with a melting point of 160° C., an MFR (230° C.) of 2.6 g/10 min and a density of 0.87 g/cm³, 8% (by weight percentage) of a crystalline copolymer elastomer of ethylene and propylene with a melting point of 130° C., an MFR (230° C.) of 9.5 g/10 min and a density of 0.91 g/cm³, and 8% (by weight percentage) of a low-density polyethylene with a melting point of 105° C. and an MFR (230° C.) of 12 g/10 min;
- an intermediate resin layer: a mixture layer formed of 62% (by weight percentage) of randomly copolymerized polypropylene with a melting point of 155° C. and an MFR (230° C.) of 4 g/10 min, 33% (by weight percentage) of a non-crystalline propylene-based elastomer, and 5% (by weight percentage) of a low-density polyethylene with a melting point of 110° C. and an MFR (230° C.) of 7.5 g/10 min, by weight;
- an innermost resin layer: a layer composed of randomly copolymerized polypropylene with a melting point of 155° C. and an MFR (230° C.) of 15 g/10 m;
- wherein the thickness ratio of the resin layer in contact with the aluminum alloy foil layer to the intermediate resin layer to the innermost resin layer was 10:8:2.

After the internal hot-melt connecting resin being the hot-melt connecting layer 8 was compounded onto a surface of the Mg—Al alloy foil layer of the aluminum alloy foil layer by melting and co-extruding in a semi-finished product comprising the substrate layer (25 μm), the second bonding layer (3 μm), and the aluminum alloy foil layer (40 μm), a thermal treatment was performed at 180° C. for 2 s.

Thus, a composite-finished product comprising the substrate layer (25 μm), the second bonding layer (3 μm), the aluminum alloy foil layer (40 μm), and the hot-melt connecting layer (40 μm) was formed.

Meanwhile, the surface of the substrate layer was coated with the same amount of the Slip agent as in Example 1.

Example 7

Substrate Layer:

The substrate layer was composed of a 2-stage asynchronous biaxially stretched polyethylene terephthalate (PET) film with a thickness of 3 μm, an acid-modified polyolefin layer with a thickness of 2 μm and a 2-stage asynchronous biaxially stretched nylon film with a thickness of 20 μm, amounting to a total thickness of 25 μm.

Aluminum Alloy Foil Layer:

A 3-layer composite aluminum alloy foil of a first Mg—Al alloy foil layer, a 8021 Al foil layer, and a second Mg—Al alloy foil layer (in a thickness ratio of 2:6:2) with a total thickness of 40 μm was used. Each of the first and second Mg—Al alloy foil layers contained 1.8% of Mg, 1.4% of Fe, 0.1% of Si and 0.02% of Sb by mass percentage, and after annealing, the precipitation ratio of Mg to Al on the surface of the aluminum alloy foil layer was 3.5.

A solution-type mixture formed of an anhydrous maleic anhydride-modified polypropylene solution with a weight-average molecular weight of 60,000, a melting point of 75° C. and an acid value of 5 mg KOH/g, and an epoxy resin solution in a solid ratio of 10:1 was uniformly applied to a surface of one of the first and second Mg—Al alloy foil layers in the semi-finished product, and then dried to form the second bonding layer 7.

A surface of a 40 μm of CPP film (the same as that in Example 1) being the hot-melt connecting layer 8 was subjected to a corona treatment, and then the surface was heat-compounded with the second bonding layer 7 at 100° C., followed by aging at 40° C. for 7 days. Thus, a composite-finished product comprising the substrate layer (25 μm), the first bonding layer (3 μm), the aluminum alloy foil layer (40 μm), the second bonding layer (3 μm), and the hot-melt connecting layer (40 μm) was formed.

Meanwhile, the surface of the substrate layer was coated with the same amount of the Slip agent as in Example 1.

Example 8

Substrate Layer:

A 2-stage asynchronous biaxially stretched nylon film with a thickness of 25 μm was used as the substrate layer.

Aluminum Alloy Foil Layer:

A one-layer aluminum alloy foil layer, with a thickness of 40 μm, comprising 1% of Mg, 1.2% of Fe, 0.15% of Si and 0.01% of Sb by mass percentage was used, and after annealing, the precipitation ratio of Mg to Al on the surface of the aluminum alloy foil layer was 2.

A composite-finished product comprising the substrate layer (25 μm), the first bonding layer (3 μm), the aluminum alloy foil layer (40 μm), the second bonding layer (1.5 μm), and the hot-melt connecting layer (40 μm) was formed using the method in Example 1. Meanwhile, the surface of the substrate layer was also coated with the same amount of the Slip agent as in Example 1.

Comparative Example 1

Substrate Layer:

A 2-stage asynchronous biaxially stretched nylon film with a thickness of 25 μm was used as the substrate layer.

Aluminum Alloy Foil Layer:

The aluminum alloy used was an 8021 aluminum foil that was thermally treated and then annealed, having a thickness of 40 μm and containing 1.4% of Fe and 0.1% of Si.

A composite-finished product comprising the substrate layer (25 μm), the first bonding layer (3 μm), the aluminum alloy foil layer (40 μm), the second bonding layer (1.5 μm), and the hot-melt connecting layer (40 μm) was formed using the method in Example 1. Meanwhile, the surface of the substrate layer was also coated with the same amount of the Slip agent as in Example 1.

Comparative Example 2

Substrate Layer:

A 2-stage asynchronous biaxially stretched polybutylene terephthalate (PBT) film with a thickness of 25 μm was used as the substrate layer.

Aluminum Alloy Foil Layer:

The aluminum alloy used was a 3004 aluminum foil that was thermally treated but not annealed, having a thickness of 40 μm and containing 1.2% of Mg, 0.7% of Fe, 1.2% of Mn and 0.3% of Si, and the precipitation ratio of Mg to Al on the surface of the aluminum alloy foil layer was 1/5.

A composite-finished product comprising the substrate layer (25 μm), the first bonding layer (3 μm), the aluminum alloy foil layer (40 μm), the second bonding layer (20 μm), and the hot-melt connecting layer (20 μm) was formed using the method in Example 4.

Meanwhile, the surface of the substrate layer was coated with the same amount of the Slip agent as in Example 1.

Comparative Example 3

Substrate Layer:

A 2-stage asynchronous biaxially stretched polybutylene terephthalate (PBT) film with a thickness of 25 μm was used as the substrate layer.

Aluminum Alloy Foil Layer:

The aluminum alloy used was a 5052 aluminum foil that was thermally treated but not annealed, having a thickness of 100 μm and containing 2.5% of Mg, 0.4% of Fe, 0.2% of Cr and 0.2% of Si, and the precipitation ratio of Mg to Al on the surface of the aluminum alloy foil layer was 11/20.

A composite-finished product comprising the substrate layer (25 μm), the first bonding layer (3 μm), the aluminum alloy foil layer (100 μm), the second bonding layer (1.5 μm), and the hot-melt connecting layer (40 μm) was formed using the method in Example 1. Meanwhile, the surface of the substrate layer was also coated with the same amount of the Slip agent as in Example 1.

The test results of Examples 1-8 and Comparative Examples 1-3 are shown in Table 2 below.

TABLE 2

Results of performance test

| Performance | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Thickness of aluminum foil (μm) | 40 | 40 | 40 | 40 | 100 | 40 | 40 | 40 | 40 | 40 | 100 |
| Mg content (%) | 1 | 1.5 | 2 | 1.5 | 1.5 | 1 | 1.8 | 1 | 0 | 1.2 | 2.5 |
| Fe content (%) | 1.2 | 1.5 | 2 | 1.5 | 1.5 | 1.5 | 1.4 | 1.2 | 1.4 | 0.7 | 0.4 |
| Precipitation ratio of Mg/Al | 2 | 3.1 | 4 | 3.1 | 3 | 2.1 | 3.5 | 2 | 0 | 1/5 | 11/20 |
| Si content (%) | 0.1 | 0.1 | 0.1 | 0.04 | 0.01 | 0.1 | 0.1 | 0.15 | 0.1 | 0.3 | 0.2 |
| Sb content (%) | 0.02 | 0.02 | 0.02 | 0.04 | 0.04 | 0.02 | 0.02 | 0.01 | 0 | 0 | 0 |
| Average particle size (μm) | 3.7 | 3.7 | 3.7 | 2.2 | 2.3 | 3.6 | 3.6 | 8.0 | 3.8 | 12 | 12 |
| Maximum particle size (μm) | 14 | 14 | 14 | 10 | 10 | 15 | 15 | 25 | 14 | 50 | 46 |
| Tensile strength (MPa) | 101 | 115 | 124 | 119 | 118 | 116 | 115 | 120 | 106 | 144 | 154 |
| Elongation (%) | 12.3 | 16.1 | 21.3 | 17.5 | 16.9 | 15.7 | 15.1 | 11.0 | 13.8 | 8.5 | 7 |
| Current flow | x | x | x | x | x | x | x | x | o | o | o |
| Generation of Li-Al alloy | □ | □ | □ | □ | □ | □ | □ | □ | Δ | Δ | Δ |
| Packaging material forming limit (mm) | 6.4 | 6.8 | 7.0 | 7.2 | 10 | 6.8 | 7.0 | 6.2 | 6.5 | 5.3 | 4.1 |

Note:
o indicates presence a current flow, and
x indicates absence of a current flow;
Δ indicates generation of Li-Al alloy, and
□ indicates no Li-Al alloy generated As can be seen from the above table:

from the comparison of Examples 1-8 and Comparative Example 1, it can be seen that the 8021 aluminum foil had a current flow and the generation of Li—Al alloy in the resistance to electrolyte solution test, showing the occurrence of corrosion, while none of Examples 1-8 had been corroded, indicating that the presence of Mg and its precipitation to the surface can improve the resistance to electrolyte solution of the aluminum-plastic composite film;

from the comparison of Examples 2,4,5-7 and Comparative Example 1, it can be seen that the performance of the 8021 aluminum foil in deep drawing and tensile test was not as good as that of the aluminum alloy foil containing the same content of Fe as in Examples 2 and 4, indicating that increasing the content of Sb or decreasing the content of Si is beneficial to the particle refining of the aluminum alloy foil, and can improve the mechanical performance of the aluminum alloy foil;

from the comparison of Example 4 and Comparative Example 2, it can be seen that the higher contents of Fe and Sb and the lower content of Si reduced the hardness and strength of the aluminum alloy foil, which is beneficial to the particle refining of the aluminum alloy foil, and can improve the elasticity and formability of the aluminum alloy foil;

from the comparison of Examples 1-8 and Comparative Example 3, it can be seen that 5052 aluminum foil had a current flow and the generation of Li—Al alloy in the resistance to electrolyte solution test, showing the occurrence of corrosion, suggesting that the presence of Mg and its precipitation to the surface in a high ratio can improve the resistance to electrolyte solution of the aluminum-plastic composite film;

from the comparison of Example 5 and Comparative Example 3, it can be seen that the lower contents of Fe and Sb and the higher content of Si improved the hardness and strength of the aluminum alloy foil, but is not beneficial to the particle refining of the aluminum alloy foil, and may reduce the elasticity and formability of the aluminum alloy foil.

The raw materials and conventional methods mentioned above are common general knowledge well known to those skilled in the art, and will not be described in detail herein.

The above description is only for the purpose of illustrating some specific examples of the present invention and is not intended to limit the present invention. Any modification, equivalent substitution and improvement and the like made without departing from the spirit and principle of the present invention shall fall within the protection scope of the present invention. The technical scope of the present invention is not limited to the content of the specification, and must be determined according to the scope of the claims.

What is claimed is:

1. An outer packaging material, adapted for use in a battery apparatus, comprising: a substrate layer (1), a barrier layer (5) and a hot-melt connecting layer (8); the barrier layer (5) is formed by an aluminum alloy foil, and the aluminum alloy foil comprises one or more layers; characterized in that, the aluminum alloy foil comprises 1.2%-2% of Fe, 1%-2% of Mg, 0.01%-0.2% of Si, and 0.02%-0.06% of Sb by mass percentage; after the aluminum alloy foil is annealed, a ratio of precipitated Mg to precipitated Al is 2-4.

2. The outer packaging material according to claim 1, further comprising: a first bonding layer (2); the first bonding layer (2) is disposed between the substrate layer (1) and the barrier layer (5).

3. The outer packaging material according to claim 1, further comprising: a second bonding layer (7), wherein the second bonding layer (7) is disposed between the barrier layer (5) and the hot-melt connecting layer (8).

4. The outer packaging material according to claim 1, further comprising: a first bonding layer (2) and a second bonding layer (7); the first bonding layer (2) is disposed between the substrate layer (1) and the barrier layer (5); the second bonding layer (7) is disposed between the barrier layer (5) and the hot-melt connecting layer (8).

5. The outer packaging material according to claim 1, wherein the aluminum alloy foil further comprises: 0.01% or less of Mn, 0.03% or less of Zn, and 0.01% or less of Cr by mass percentage.

6. The outer packaging material according to claim 1, wherein the aluminum alloy foil has an average particle size of 10 μm or less.

7. The outer packaging material according to claim 1, wherein 90% or more of particles of the aluminum alloy foil have a particle size in a range of 0.01-30 μm.

8. The outer packaging material according to claim 1, wherein the aluminum alloy foil has a thickness of 20-100 μm.

9. The outer packaging material according to claim 1, wherein at least a surface of the barrier layer (5) compounded with the hot-melt connecting layer (8) is subjected to corrosion-resistant treatment with a corrosion-resistant agent to form a corrosion-resistant layer; the corrosion-resistant agent comprises: aminophenol, polyacrylic acid and a modified polyolefin; the corrosion-resistant treatment includes chromium nitrate treatment, chromium phosphate treatment and cerium treatment; the corrosion-resistant layer has a thickness of 2 μm or less.

10. The outer packaging material according to claim 1, wherein the hot-melt connecting layer (8) comprises one or more layers of modified polypropylene, polypropylene, or polyolefin, with a thickness of 20-120 μm.

11. A battery comprising the outer packaging material according to claim 1.

* * * * *